(12) United States Patent
Claussen et al.

(10) Patent No.: US 9,402,214 B2
(45) Date of Patent: Jul. 26, 2016

(54) WIRELESS COMMUNICATIONS USING OVERLAY NETWORK DEVICES WITHIN COVERAGE AREAS OF UNDERLAY NETWORK DEVICES

(71) Applicant: ALCATEL-LUCENT USA INC., Murray Hill, NJ (US)

(72) Inventors: Holger Claussen, Swindon (GB); Lester Tse Wee Ho, Swindon (GB); Irwin O. Kennedy, Londonberry (GB); Zhengxiang Ma, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/941,735

(22) Filed: Nov. 16, 2015

(65) Prior Publication Data

US 2016/0100342 A1    Apr. 7, 2016

Related U.S. Application Data

(63) Continuation of application No. 11/562,467, filed on Nov. 22, 2006, now abandoned.

(51) Int. Cl.
| | |
|---|---|
| *H04W 36/04* | (2009.01) |
| *H04W 36/00* | (2009.01) |
| *H04W 4/06* | (2009.01) |
| *H04W 48/12* | (2009.01) |

(52) U.S. Cl.
CPC ............... *H04W 36/04* (2013.01); *H04W 4/06* (2013.01); *H04W 36/0083* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 6,289,007 B1 | 9/2001 | Kim et al. | |
| 6,377,585 B1 | 4/2002 | Funderburk et al. | |
| 6,438,379 B1 | 8/2002 | Gitlin et al. | |
| 6,741,578 B1 | 5/2004 | Moon et al. | |

(Continued)

FOREIGN PATENT DOCUMENTS

| | | |
|---|---|---|
| WO | 96/06512 | 2/1996 |
| WO | 2006/058562 A1 | 6/2006 |

OTHER PUBLICATIONS

International Search Report and Written Opinion for International Application No. PCT/US2007/024145 dated May 30, 2008.

(Continued)

*Primary Examiner* — Suhail Khan
(74) *Attorney, Agent, or Firm* — Carlson, Gaskey & Olds, P.C.

(57) ABSTRACT

A wireless communication technique provides mobility for a mobile station to communicate with an overlay network device, which is within a coverage area of an underlay network device, when the mobile station is within a coverage area of both devices. The overlay network device broadcasts at least two downlink channels. A cell code (e.g., a scrambling code or pseudo noise offset) of a first one of the downlink channels identifies an overlay network device exclusively. The mobile station can detect the first downlink channel responsive to an indication of the exclusive cell code from the underlay network device. A second one of the downlink channels allows for subsequent, ongoing communications between the mobile station and the overlay network device.

16 Claims, 2 Drawing Sheets

(56) References Cited

U.S. PATENT DOCUMENTS

| | | | |
|---|---|---|---|
| 2004/0152480 A1 | 8/2004 | Willars et al. | |
| 2005/0043046 A1 | 2/2005 | Lee | |
| 2005/0148297 A1* | 7/2005 | Lu | H04W 4/06 455/3.06 |
| 2007/0097939 A1 | 5/2007 | Nylander et al. | |

OTHER PUBLICATIONS

International Preliminary Report on Patentability for International Application No. PCT/US2007/024145 dated Jan. 26, 2009.

Han-Sup Lee, et al., "Cell search scheme using I/Q multiplexed code assignment in asynchronous W-CDMA system" Vehicular Technology Conference, 1999 IEEE 49th Houstin, TX, USA May 16-20, 1999, Piscataway, NJ, USA, IEEE, US, Vol. 2, May 16, 1999, pp. 1560-1564, XP010342174, ISBN: 978-0-7803-5565-1.

Jung, Hong, Cho, Park, Lee: "PN offset planning for synchronous CDMA based fiber-optic microcellular systems," IEEE (online) 2000, pp. 2275-2279, XP002480275, VTC 2000, Retrieved from the internet: URL:http//ieexplore.ieee.org/ie15/6849/18409/00851678.pdf.

Mintaig, Kim, et al: "Implementation of the frequency-hooped receiver with a pilot signal," 19976011; 19970611-19970613, Jun. 11, 1997, pp. 194-195, XP010250048.

* cited by examiner

WIRELESS COMMUNICATIONS USING OVERLAY NETWORK DEVICES WITHIN COVERAGE AREAS OF UNDERLAY NETWORK DEVICES

CROSS-REFERENCE TO RELATED APPLICATION

This application is a continuation of U.S. patent application Ser. No. 11/562,467, filed Nov. 22, 2006.

TECHNICAL FIELD

This invention generally relates to communications. More particularly, this invention relates to wireless communications.

DESCRIPTION OF THE RELATED ART

In a UMTS or CDMA radio access network (RAN) deployment a geographical area is divided into cells. A nodeB (UMTS terminology) or base station (CDMA terminology) serves each cell. To assist with mobile station mobility between cells, the RAN maintains a list of neighboring cells for every cell in the network. The mobile station must learn of the neighboring cells so that it can detect signal strengths for selecting a candidate cell for future communications.

Mobility can be broadly split into two mobile station modes: idle mode mobility and active mode mobility. In idle mode, the mobile station has no active radio links to the RAN, so mobility involves choosing a nodeB or base station with a good enough signal strength upon which to "camp". When camped, the mobile station can listen to the nodeB or base station broadcast channels. This is important because the broadcast channels are used to signal an incoming phone call. The broadcast channels are also used to inform all mobile stations of neighboring cells to be considered for camping on. In active mode, the mobile station has active radio links to the RAN. As the radio channel conditions change between the mobile station and the nodeB or base station, other nodeBs or base stations must be considered as candidates with which to maintain the communication link.

It is expected that the deployment of macro-cellular networks (e.g., existing cellular networks) will be complemented by the deployment of in building (e.g., home, enterprise, government) communication devices that operate as microcell or picocell nodeBs or base stations. The former can be considered an underlay network and the latter an overlay network because the latter will be, in effect, established on top of or in addition to the macro-cellular network. The in-building overlay network will be intended to complement the macro-cellular, underlay network.

Establishing overlay networks will increase cellular coverage and capacity. However, it heralds a new deployment scenario that current specifications and standards are not designed to provide. There are a number of problems associated with this, including how to provide mobile station mobility between the traditional macro-cellular network deployment and the overlay deployment.

In most cases, the mobile station relies on the RAN to inform of it of the presence of neighboring cells (nodeBs and base stations) and their cell codes (scrambling codes or pseudo noise offsets). Neighboring cells use different cell codes compared to those around them to enable the mobile station to separate the transmissions of interest from those of other cells. The number of neighbors is limited to a set of 32 intra-frequency cells. If an overlay network is deployed, the number of neighbors can become much greater than 32. It is possible to have hundreds of apartments inside one underlay cell, for example, with each apartment containing an overlay cell. There needs to be a mechanism to inform the mobile station of all neighbors so they can be considered as a candidate for camping or handoff.

One suggestion is to modify the RAN infrastructure to inform it of the overlay network's presence. For example, a radio network controller could be informed of every cell in the overlay network that the mobile station is permitted to use. Then, when the mobile station is informed of neighbors through messages transmitted by the RAN the list is augmented with mobile-station-specific nodeBs. Providing mobile-station-specific neighbor lists overcomes the limitation of 32 intra-frequency neighbor cells but it increases the task and complexity of maintaining up-to-date neighbor lists. Overlay network devices may be arbitrarily introduced into or removed from a macro-cell coverage area and the RAN would need to be updated accordingly on an inconveniently frequent basis. Additionally, modifying the RAN in this manner does not solve the idle mode mobility problem. In idle mode, no active radio link exists between the mobile station and the RAN. The mobile station therefore relies on the underlay network broadcast channels to inform it of candidate cells upon which to camp. In idle mode there is no facility to provide a mobile-station-specific neighbor list.

Another suggestion instead of modifying the RAN is to modify the mobile station to store the list of overlay cells it is allowed to access. Then the mobile station adds its stored set of potential candidates to any neighbor list received from the RAN. This requires changing the way current mobile stations operate and hinders simple deployment of an overlay network. Existing mobile stations would have to be reconfigured to have the necessary capacity for this feature.

Both of the above suggestions have the drawback of requiring substantial changes to existing equipment (mobile station or RAN). This is expensive, carries significant risk and is unattractive to the network operator.

There is a need for an efficient and economical way of facilitating a mobile station communicating with an overlay network within the coverage area of a macro-cellular underlay network. This invention addresses that need.

SUMMARY

An exemplary method of communication is useful in a system including at least one underlay network device having a first coverage area and at least one overlay network device having a second, smaller coverage area within the first coverage area of the underlay network device. The exemplary method includes using a selected plurality of cell codes for identifying overlay network devices exclusively. Communications are conducted using a selected plurality of cell codes exclusively for identifying overlay network devices. The first downlink channel has one of the selected plurality of cell codes such that a mobile station communicating with an underlay network device can detect the overlay network device as a candidate overlay network device for communications with the mobile station.

An exemplary communication device comprises a transmitter that broadcasts at least two downlink channels. A cell code of a first one of the downlink channels is one of a selected plurality of cell codes used for identifying overlay network devices exclusively. A cell code of a second one of the downlink channels is distinct from the selected plurality of cell codes.

The various features and advantages of this invention will become apparent to those skilled in the art from the following detailed description. The drawings that accompany the detailed description can be briefly described as follows.

DETAILED DESCRIPTION

The following description demonstrates how example embodiments of this invention allow for a mobile station to communicate with underlay network devices (e.g., macro-cell base stations) and overlay network devices (e.g., pico-cell base stations) within the coverage area of the underlay network. The disclosed examples are useful for a variety of communication scenarios including active call handovers between the underlay and overlay networks and idle mode candidate cell identification of underlay cells, overlay cells or both. The disclosed examples facilitate employment of overlay networks and devices within areas covered by existing underlay network devices in an efficient and economical manner.

Figure 1:
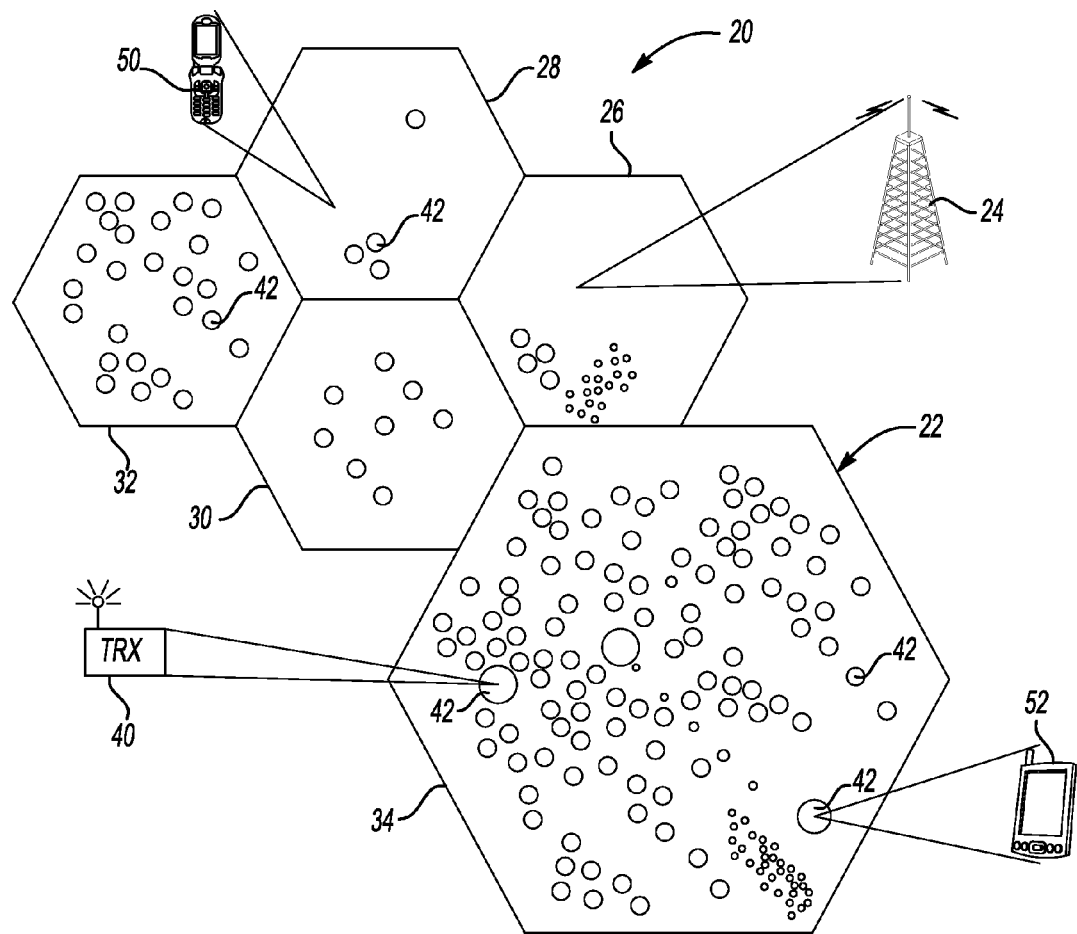
FIG. 1 schematically shows selected portions of a wireless communication system with which an embodiment of this invention is useful.

FIG. 1 schematically shows an example communication system 20. An overlay network 22 includes a plurality overlay network communication devices 22 that provide wireless communication coverage in corresponding cells. In a UMTS example, the devices 22 are nodeBs and in a CDMA example, the devices 22 are base station transceivers. Only one such device is shown in FIG. 1 for simplicity. Each of the devices 22 provides a coverage area for a corresponding one of a plurality of cells 26, 28, 30, 32 and 34. The size of the cells 26-34 is such that the cells are considered macrocells.

Other communication devices 40 provide wireless communication coverage areas or cells 42 within the coverage areas of the cells 26-34. Only one such device is shown for simplicity but there would be one associated with each of the cells 42 schematically shown in FIG. 1. The communication devices are considered part of an overlay network for purposes of discussion because the wireless coverage provided by the devices 40 complements and is placed on top of that provided by the overlay network devices 24.

Each communication device 40 includes a transceiver such that it operates as a nodeB or base station of the corresponding cell 42.

Mobile stations can communicate with the communication devices 24, the communication devices 40, or both, depending on the situation of the particular mobile station. The illustrated example includes a mobile station 50 within the cell 28 and another mobile station 52 within the cell 34. The mobile station 50 is not within a coverage area of any of the overlay network cells 42 and can only communicate with the underlay network devices 24. The mobile station 52, on the other hand, is within the coverage area of one of the overlay cells 42 and the underlay cell 34. The illustrated example provides the mobile station 52 an ability to communicate with either network by communicating with either or both of the corresponding communication device 24 and the corresponding communication device 40. In other words, the mobile station 52 has mobility between the overlay and underlay networks.

Figure 2:
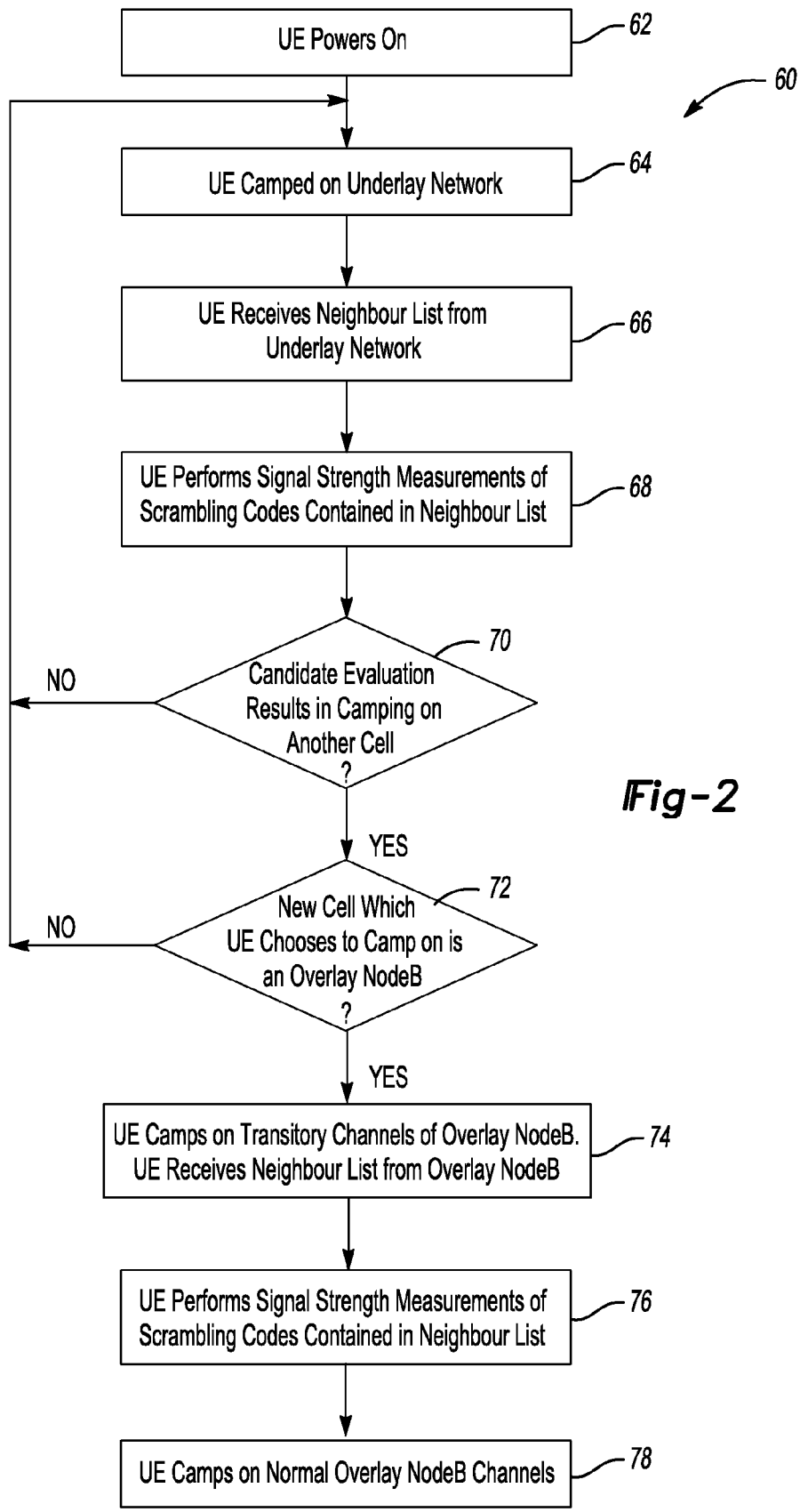
FIG. 2 is a flowchart diagram summarizing one example approach.

One example approach is summarized in a flow chart 60 in FIG. 2. This example includes the mobile station 52 being powered on at 62. Initially, the mobile station uses known techniques for camping on a channel of the underlay network. This status is shown at 64. In a known manner, the mobile station 52 receives a neighbor list of cell codes (e.g., scrambling codes or pseudo noise offsets) from the underlay network 22 as shown at 66.

One example includes cell codes within the neighbor list provided by the underlay network 22 that notify a mobile station of the communication devices 40 of the overlay network within the region of the current mobile station location. One example includes reserving a relatively small number of cell codes exclusively for identifying the cells 42 of the overlay network. In one UMTS example, eight of the 512 available scrambling codes are used exclusively for identifying the cells 42. In one CDMA example, a plurality of PN offsets are used exclusively for identifying the overlay cells 42.

In one example, every overlay communication device 40 broadcasts two downlink channels instead of just one. A first one of the downlink channels has one of the cell codes that is exclusively dedicated to identifying the overlay cells 42. The second one of the two downlink channels has a cell code that is distinct from those in the reserved set used exclusively for identifying the cells 42. The first downlink channel can be considered a "transitory" broadcast channel because it provides information that facilitates mobile station mobility between the overlay network and the underlay network 22. The second downlink channel is a "normal" broadcast channel because it is used for communications within an overlay cell 42 in a manner like the normal broadcast channels are used in the overlay cells 26-34. The cell code of the second downlink channel is chosen so that it does not conflict with any neighbor cell codes in the underlay or overlay network.

The neighbor list of the underlay network, which is provided by the traditional RAN is modified in one example to always include the reserved set of cell codes that exclusively identify the overlay cells. The mobile station receiving the neighbor list performs signal strength measurements at 68 to evaluate potential candidate cells on which the mobile station can camp. Because the neighbor list include those cell codes that exclusively identify overlay cells 42, the mobile station will be monitoring overlay communication device 40 transitory downlink channel broadcasts.

At this stage, the mobile station is informed of the overlay network's presence. The mobile station will now perform signal strength measurements on the reserved cell codes. The overlay cells will therefore be considered as camping candidates and as active mode handover candidates.

At 70, the mobile station determines whether to switch from a current cell. If not, the mobile station operation returns to 64. If a monitored broadcast downlink channel indicates that a switch is desirable, a determination is made at 72, whether the new cell selected by the mobile station is an overlay cell 42. If so, the mobile station camps on the transitory downlink channel (e.g., the first of the two downlink channels) of the corresponding overlay cell 42 at 74. Then the mobile station can identify the second of the downlink channels of the corresponding overlay cell 42 based on communications on the first (e.g., transitory) of the downlink channels on which the mobile station has camped.

Essentially, the two downlink channels radiating from a single overlay communication device 40 result in two different cells being presented to the mobile station. A mobile station informed by the underlay network will only be aware of one of these cells (i.e., the "transitory" cell code). Once the mobile station camps on the transitory cell, however, the transitory broadcast channel (BCH) broadcast messages will then inform the mobile station of the second of the two downlink channels (e.g., the "normal" cell). In one UMTS example, the transitory cell's BCH System Information Block 11 (SIB11) is populated to contain the normal cell's cell code.

To reduce radio interference, the transitory downlink channels are only used for a short time in one example in order to bridge the overlay and underlay networks. At 76, the mobile station determines signal strengths of the neighbor set provided by the overlay communication device 40.

One example includes fixing the power of the transitory channels to be a fraction of the normal downlink channels of the overlay cells. The second downlink channel cell code is included in the transitory broadcast channel neighbor list. In the transitory broadcast channels of one example, the signal strength at which the mobile station evaluates other candidates for camping on is set very low. In a UMTS example, this parameter is called $S_{intrasearch}$, included in SIB3/4 messages, which are known from 3GPP specifications 25.304, for example. The mobile station selects the normal cell code associated with the second of the two downlink channels due to its higher signal strength. The mobile station camps on a normal overlay cell channel at 78.

Once the mobile station camps on the normal overlay cell 42, it may be desirable that it remains camped on it, even if another cell becomes a better candidate. For example, a network operator's goal may be to take traffic off their macrocellular network and direct it onto the overlay cells 42. This is achieved in one example by setting parameters in the BCH channels appropriately. For example, thresholds for starting the cell-reselection procedure are set very high.

In another example, once handover is complete to the transitory overlay cell, the overlay communication device 40 instructs the mobile station to handover to the normal cell of the overlay device 40.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating in a system including at least one first type of network device having a first transmit power and a first carrier frequency and at least one second type of network device having at least one of a second transmit power that is lower than the first transmit power and a second carrier frequency that is higher than the first carrier frequency, the second type of network device operating within a first coverage area of the first type of network device, wherein there is a selected plurality of cell codes dedicated exclusively for identifying only the second type of network device such that the selected plurality of cell codes are never used for identifying the first type of network device, wherein the first type of network device provides a neighbor list including at least some of the selected plurality of cell codes, the method comprising:
broadcasting a first downlink channel of at least two downlink channels from the second type of network device, wherein the first downlink channel is a transitory broadcast channel that provides information to facilitate mobile station mobility between the first type of network device and the second type of network device;
using one of the selected plurality of cell codes as a cell code for the first downlink channel such that a mobile station receiving the provided neighbor list from the first type of network device can detect the second type of network device as a candidate for communications with the mobile station based on the first downlink channel;
broadcasting a second downlink channel of the at least two downlink channels, wherein the second downlink channel is used for communications within a cell of the second type of network device;
using a second channel cell code that is distinct from the selected plurality of cell codes for the second downlink channel; and
providing an indication of the second channel cell code to the mobile station on the first downlink channel to facilitate the mobile station communicating with the second type of network device on the second downlink channel using the second channel cell code.

2. The method of claim 1, wherein the second cell code is only detectable by a mobile station receiving on the first downlink channel.

3. The method of claim 2, comprising
broadcasting the first downlink channel using a first signal strength; and
broadcasting the second downlink channel using a second, greater signal strength.

4. The method of claim 1, comprising
using the first downlink channel for detecting the second type of network device; and
conducting subsequent communication with the second type of network device on the second downlink channel.

5. The method of claim 1, comprising
detecting a signal strength of the first and second downlink channels, respectively; and
selecting the one of the downlink channels having a greater signal strength for communicating with the second type of network device.

6. The method of claim 1, wherein the cell codes comprise at least one of a scrambling code or a pseudo noise offset.

7. The method of claim 1, wherein
there are eight cell codes in the selected plurality of cell codes; and
any other possible cell codes not in the selected plurality of cell codes are allocated for use on the second downlink channel.

8. The method of claim 1, comprising
establishing a first threshold for a mobile station currently communicating with the first type of network device to switch to communicating with the second type of network device; and
establishing a second, higher threshold for a mobile station currently communicating with the second type of network device to switch to communicating with the first type of network device.

9. A communication system, comprising:
at least one first type of network device having a first coverage area, a first transmit power and a first carrier frequency;
at least one second type of network device having at least one of a second transmit power that is lower than the first transmit power and a second carrier frequency that is higher than the first carrier frequency, the second type of network device operating within the first coverage area of the first type of network device;
wherein
there is a selected plurality of cell codes dedicated exclusively for identifying only the second type of network device such that the selected plurality of cell codes are never used for identifying the first type of network device, the first type of network device provides a neighbor list including at least some of the selected plurality of cell codes, the second type of network device broadcasts at least two downlink channels, a first downlink channel of the at least two downlink channels is a transitory broadcast channel that provides information to facilitate mobile station mobility between the first type of network device and the second type of network device, one of the selected plurality of cell codes is a cell code for the first downlink channel such that a mobile station receiving the neighbor list from the first type of network device can detect the second type of network device as a candidate for communications with the mobile station based on the first downlink channel, a second downlink channel of the at least two downlink channels is used for communications within a cell of the second type of network device;

a second channel cell code that is distinct from the selected plurality of cell codes is a cell code for the second downlink channel, and the second type of network device provides an indication of the second channel cell code to the mobile station on the first downlink channel to facilitate the mobile station communicating with the second type of network device on the second downlink channel using the second channel cell code.

10. The system of claim 9, wherein the second cell code is only detectable by a mobile station receiving on the first downlink channel.

11. The system of claim 9, wherein the second type of network device broadcasts the first downlink channel using a first signal strength; and broadcasts the second downlink channel using a second, greater signal strength.

12. The system of claim 9, wherein the mobile station uses the first downlink channel for detecting the second type of network device; and conducts subsequent communication with the second type of network device on the second downlink channel.

13. The system of claim 9, wherein the mobile station detects a signal strength of the first and second downlink channels, respectively; and selects the one of the downlink channels having a greater signal strength for communicating with the second type of network device.

14. The system of claim 9, wherein the cell codes comprise at least one of a scrambling code or a pseudo noise offset.

15. The system of claim 9, wherein there are eight cell codes in the selected plurality of cell codes; and any other possible cell codes not in the selected plurality of cell codes are allocated for use on the second downlink channel.

16. The system of claim 9, wherein there is a first threshold for a mobile station currently communicating with the first type of network device to switch to communicating with the second type of network device; and there is a second, higher threshold for a mobile station currently communicating with the second type of network device to switch to communicating with the first type of network device.

* * * * *